(12) United States Patent
Ishibashi et al.

(10) Patent No.: US 8,447,590 B2
(45) Date of Patent: May 21, 2013

(54) VOICE EMITTING AND COLLECTING DEVICE

(75) Inventors: Toshiaki Ishibashi, Fukuroi (JP); Ryo Tanaka, Hamamatsu (JP); Satoshi Ukai, Hamamatsu (JP)

(73) Assignee: Yamaha Corporation (JP)

( * ) Notice: Subject to any disclaimer, the term of this patent is extended or adjusted under 35 U.S.C. 154(b) by 1073 days.

(21) Appl. No.: 12/306,413

(22) PCT Filed: Jun. 20, 2007

(86) PCT No.: PCT/JP2007/062393
§ 371 (c)(1),
(2), (4) Date: Dec. 23, 2008

(87) PCT Pub. No.: WO2008/001659
PCT Pub. Date: Jan. 3, 2008

(65) Prior Publication Data
US 2009/0248408 A1    Oct. 1, 2009

(30) Foreign Application Priority Data
Jun. 29, 2006  (JP) .................. 2006-179792

(51) Int. Cl.
*G10L 11/00* (2006.01)

(52) U.S. Cl.
USPC ........................................ 704/200

(58) Field of Classification Search
None
See application file for complete search history.

(56) References Cited

U.S. PATENT DOCUMENTS

| | | | |
|---|---|---|---|
| 5,335,011 A | 8/1994 | Addeo et al. | |
| 5,778,085 A | 7/1998 | Sasaki | |
| 7,117,145 B1 * | 10/2006 | Venkatesh et al. | ............ 704/200 |
| 2003/0059061 A1 | 3/2003 | Tsuji et al. | |

FOREIGN PATENT DOCUMENTS

| | | |
|---|---|---|
| JP | 58-56563 A | 4/1983 |
| JP | 58-56564 A | 4/1983 |
| JP | 03136557 A | 6/1991 |
| JP | 8-505745 A | 6/1996 |
| JP | 8-298696 A | 11/1996 |
| JP | 2003-087890 A | 3/2003 |
| JP | 2004165775 A | 6/2004 |

OTHER PUBLICATIONS

"PJP-100H Toriatsukai Setsumeisho"; IP Audio Conference System;Owners Manual; Jun. 23, 2006; pp. 16, 45 and 78; Internet address: URL:http://web.archive.org/web/20061104124825/http://www.yamaha.co.jp/projectphone/download/firm/index.html. International search report issued in corresponding PCT/JP2007/062393, dated Sep. 11, 2007.
Office action cited in corresponding Japanese patent application 2006-179792, issued Sep. 6, 2011. English translation is provided.

* cited by examiner

*Primary Examiner* — Jakieda Jackson
(74) *Attorney, Agent, or Firm* — Rossi, Kimms & McDowell LLP

(57) ABSTRACT

A voice emitting and collecting device that is capable of picking up/outputting a voice emitted from a talker at a high S/N ratio by eliminating the influence of a diffracting voice despite a simple configuration is provided. A signal differencing circuit 191 outputs difference signals MS1 to MS4 between voice collecting beam signals MB11 to MB14 and voice collecting beam signals MB21 to MB24. A level comparator 195 selects the difference signal having a maximum level. A signal selecting circuit 196 selects voice collecting beam signals MB1x, MB2x of the difference signal MS that is selected/pointed by the level comparator 195. A subtracter 199 subtracts the voice collecting beam signal MB2x from the voice collecting beam signal MB1x, and output a resultant signal. Accordingly, main components of the diffracting voice can be removed from the voice collecting beam signal.

5 Claims, 7 Drawing Sheets

VOICE EMITTING AND COLLECTING DEVICE

TECHNICAL FIELD

The present invention relates to a voice emitting and collecting device used in a talk session held between a plurality of locations via a network, or the like, and others and, more particularly, a voice emitting and collecting device in which microphones and speakers are aligned in relatively close positions.

BACKGROUND ART

In the prior art, as the method of holding a talk session between remote locations, the method of providing a voice emitting and collecting device every spot where a talk session is had, connecting these units via a network, and transmitting/receiving a voice signal is used mostly. Also, in most of the voice emitting and collecting devices, speakers for emitting voices of the units on the other end side respectively and microphones for picking up voices of the unit on this side respectively are provided to one case.

For example, in the talk session unit (voice emitting and collecting device) in Patent Literature 1, the voice signal being input via the network is emitted from the speaker arranged on the ceiling, microphones pick up the microphone voice signals that are arranged on side surfaces and have a plurality of different directions as respective front direction respectively, and the picked-up voices are sent out to the outside via the network.

Patent Literature 1: JP-A-8-298696

DISCLOSURE OF THE INVENTION

Problems that the Invention is to Solve

However, in the unit in Patent Literature 1, since the speaker and the microphones are provided in the vicinity of each other, a substantial amount of voice from the speaker is contained in the picked-up signals of respective microphones. Therefore, a S/N ratio of the picked-up signal to the voice emitted from the talker present at the unit is low, and, as a result, it is impossible to clearly pick up/output the voice emitted from the talker.

Therefore, it is an object of the present invention to provide a voice emitting and collecting device capable of picking up/outputting a voice emitted from a talker at a high S/N ratio by eliminating the influence of a diffracting voice despite a simple configuration.

Means for Solving the Problem

A voice emitting and collecting device of the present inventions includes a speaker for emitting a voice at a sound pressure that is symmetrical with respect to a predetermined reference plane; a first microphone group for collecting a voice on one side of the predetermined reference plane, and a second microphone group for collecting a voice on other side of the predetermined reference plane; a voice collecting beam generating portion for generating respective voice collecting beam signals of a first voice collecting beam signal group based on voice collecting signals of the first microphone group and which generates respective voice collecting beam signals of a second voice collecting beam signal group based on voice collecting signals of the second microphone group symmetrically with respect to the predetermined reference plane; a difference signal generating portion for generating difference signals between the voice collecting beam signals of the first voice collecting beam signal group and the voice collecting beam signals of the second voice collecting beam signal group respectively; a signal comparing portion for comparing absolute levels of respective difference signals to select a difference signal having a maximum level; and a voice collecting beam signal outputting portion for outputting the difference signal having the maximum level, which is selected by the signal comparing portion.

According to this configuration, respective voice collecting beam signals of the first voice collecting beam signal group and respective voice collecting beam signals of the second voice collecting beam signal group are symmetrical with respect to the reference plane. Therefore, the diffracting voice components of both voice collecting beam signals that have a symmetrical relationship with respect to the reference plane have the same magnitude in the direction perpendicular to the reference plane. The difference signals are produced by differencing respective voice collecting beam signals that have a symmetrical relationship with respect to the reference plane, and then signal levels of these signals are compared with each other. As a result, the difference signal whose signal level is maximum is selected as an output signal. Also, the speaker emits the voice at a sound pressure that is symmetrical with respect to the reference plane. Therefore, the voice that diffracting from the speaker to the microphones can be suppressed by applying the differencing process simply to the voice collecting beam signals that have a symmetrical relationship with respect to plane. As a result, the diffracting voice contained in the picked-up voice can be suppressed surely and effectively, and an S/N ratio of the picked-up voice can be improved.

Also, in the voice emitting and collecting device of the present invention, the first microphone group includes a plurality of microphones that are aligned linearly along the predetermined reference plane, and the second microphone group includes a plurality of microphones that are aligned linearly along the predetermined reference plane.

According to this configuration, the microphone arrays are constructed along the predetermined reference plane. Therefore, when the voice collecting beam signals are produced based on the collected signals of respective microphones, merely a simple signal processing such as a delay process, or the like should be applied to respective voice collecting signals.

Also, the voice emitting and collecting device of the present invention further includes a regression voice removing portion for subtracting a pseudo signal, which is derived by processing the input voice signal by means of an adaptive filter, from the voice collecting beam signal output from the voice collecting beam signal outputting portion, to apply control such that the voice emitted from the speaker is not contained in an output voice signal.

According to this configuration, the diffracting signal contained in the voice collecting beam signal being output from the voice collecting beam signal outputting portion can be removed much more by the regression voice removing portion. Therefore, the diffracting voice can be removed more effectively.

A voice emitting and collecting device of the present invention includes a speaker for emitting a voice at a sound pressure that is symmetrical with respect to a predetermined reference plane; a first voice collecting portion for collecting a voice in a first area on one side of the predetermined reference plane as a first voice collecting signal and a second voice collecting portion for collecting a voice in a second area on other side, which is symmetrical to the first area with respect to the predetermined reference plane, as a second voice collecting signal; a difference signal generating portion for generating a difference signal between the first voice collecting signal and the second voice collecting signal; and a voice collecting signal outputting portion for outputting the difference signal.

According to this configuration, the first voice collecting signal and the second voice collecting signal are the voice signals that are produced by picking up the voice from the areas that are symmetrical with respect to the reference plane. Therefore, the diffracting voice components of the voice collecting signals that have a symmetrical relationship with respect to plane have the same magnitude in the direction perpendicular to the reference plane. The difference signals are produced by differencing respective voice collecting beam signals that have a symmetrical relationship with respect to plane, and are output. The speaker emits the voice at a sound pressure that is symmetrical with respect to the reference plane. Therefore, the voice that diffracting from the speaker to the microphones can be suppressed by applying the differencing process simply to the voice collecting beam signals that have a symmetrical relationship with respect to plane. As a result, the diffracting voice contained in the picked-up voice can be suppressed surely and effectively, and an S/N ratio of the picked-up voice can be improved. In this case, in order to collect the voice from the areas that are symmetrical with respect to the reference plane, two unidirectional microphones whose directional axes are directed symmetrically with respect to the reference plane mutually may be employed. Also, two voice collecting beam signals that are symmetrical with respect to the reference plane may be produced by constructing the microphone arrays consisting of a plurality of microphones symmetrically with respect to the reference plane.

In the voice emitting and collecting device of the present invention, the first voice collecting portion includes the first microphone array having a plurality of microphones that are aligned linearly along the predetermined reference plane, and the second voice collecting portion includes the second microphone array having a plurality of microphones that are aligned linearly along the predetermined reference plane, and the voice emitting and collecting device of the present invention further includes a first voice collecting beam signal generating portion for generating a first voice collecting beam signal from the first voice collecting signal, by setting a first virtual focal point in an opposite direction to the first area, from which the first microphone array picks up the voice, with respect to the predetermined reference plane and then delaying and synthesizing voice signals picked up by a plurality of microphones of the first microphone array respectively so that distances between the plurality of microphones of the first microphone array and the first virtual focal point become equal respectively; and a second voice collecting beam signal generating portion for generating a second voice collecting beam signal from the second voice collecting signal, by setting a second virtual focal point in an opposite direction to the second area, from which the second microphone array picks up the voice, with respect to the predetermined reference plane and then delaying and synthesizing voice signals picked up by a plurality of microphones of the second microphone array respectively such that distances between the plurality of microphones of the second microphone array and the second virtual focal point become equal respectively.

In the present invention, the microphone arrays are constructed along the predetermined reference plane. A focal point is set in the rear of the microphone array, and the voice signals are picked up to have the wave fronts that converge at this focal point. Here, the wording "to delay voice signals such that distances from a plurality of microphones of the microphone array to the virtual focal point become equal respectively" denotes the process of delaying the voice collecting signals picked up by the microphones located distant from the virtual focal point in such a way that signals can be synthesized at a timing achieved when a plurality of microphones are aligned at an equal distance from the virtual focal point, even in a situation that the distances from a plurality of microphones of the microphone array to the virtual focal point are different respectively. By applying such process, a range being put between two half-lines that are extended from the virtual focal point to pass through both sides of the microphone array respectively corresponds to the voice collecting area. When these voice collecting areas are set symmetrically with respect to the reference plane, the first voice collecting signal and the second voice collecting signal can be collected from the areas that are symmetrical with respect to the predetermined reference plane.

Advantages Of The Invention

According to the present invention, the voice emitted from the voice source direction such as the talker, or the like can be picked up/output at a high S/N ratio by eliminating the diffracting voice surely and effectively despite a simple configuration.

Figure 1:
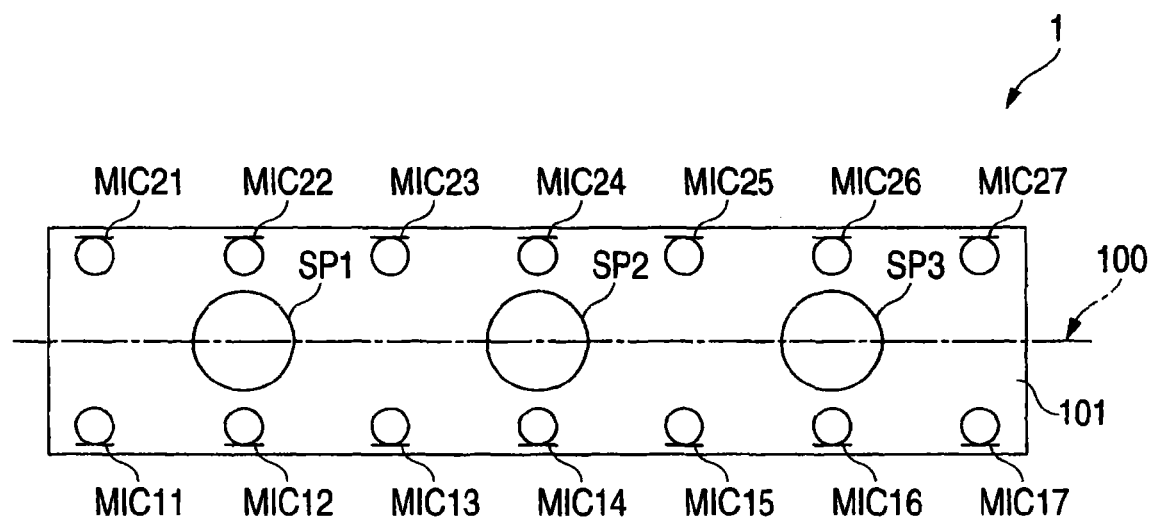
[FIG. 1] A plan view showing a microphone-speaker arrangement of a voice emitting and collecting device according to a first embodiment of the present invention.

DESCRIPTION OF REFERENCE NUMERALS AND SIGNS 1 voice emitting and collecting device
101 case
11 input/output connector
12 input/output I/F
13 directivity-of-emitted-voice controlling portion
14 D/A converter
15 voice emitting amplifier
16 voice collecting amplifier
17 A/D converter
181, 182 voice collecting beam generating portion
19 voice collecting beam selecting/correction portion
20 echo canceling portion
201 adaptive filter
202 post processor SP1 to SP3 speaker
SPA10 speaker array
MIC11 to MIC17, MIC21 to MIC27 microphone
MA10, MA20 microphone array

BEST MODE FOR CARRYING OUT THE
INVENTION

A voice emitting and collecting device according to a first embodiment of the present invention will be explained with reference to the drawings hereinafter.

FIG. 1 is a plan view showing a microphone-speaker arrangement of a voice emitting and collecting device according to a first embodiment of the present invention.

A voice emitting and collecting device 1 of the present embodiment is constructed by installing a plurality of speakers SP1 to SP3, a plurality of microphones MIC11 to MIC17, MIC21 to MIC27 into a case 101.

The case 101 is formed of an almost rectangular parallelepiped shape that is long in one direction. A leg portion (not shown) that has a predetermined height to separate a lower surface of the case 101 from the mounting surface are provided to both end portions of long sides (surfaces) of the case 101 respectively. Here, in the following explanation, a surface of longer dimension is called a long surface and a surface of shorter dimension is called a short surface.

The omni-directional discrete speakers SP1 to SP3 having a same shape respectively are installed in the lower surface of the case 101. These discrete speakers SP1 to SP3 are arranged linearly at a predetermined interval in the long direction. Also, a straight line that connects centers of respective discrete speakers SP1 to SP3 is provided along the long surface of the case 101 such that its position in the horizontal direction agrees with a center axis 100 that connects centers of the short surface. That is, the straight line connecting the centers of respective discrete speakers SP1 to SP3 is arranged on a vertical reference plane containing the center axis 100. A speaker array SPA10 is constructed by aligning/arranging the discrete speakers SP1 to SP3 in this manner. In this state, when a voice is emitted from the discrete speakers SP1 to SP3 of the speaker array SPA10 respectively, the emitted voices propagate equally through two long surfaces. At this time, the emitted voices that propagate through two opposing long surfaces travel mutually in symmetrical directions that are orthogonal to the reference plane.

The microphones MIC11 to MIC17 having the same specification are provided on one long surface of the case 101. These microphones MIC11 to MIC17 are aligned at a predetermined interval along the longer direction, and thus a microphone array MA10 is constructed. Also, the microphones MIC21 to MIC27 having the same specification are provided on the other long surface of the case 101. These microphones MIC21 to MIC27 are aligned at a predetermined interval along the longer direction, and thus a microphone array MA20 is constructed. The microphone array MA10 and the microphone array MA20 are arranged such that their vertical positions of alignment axes coincide with each other. Also, the microphones MIC11 to MIC17 of the microphone array MA10 and the microphones MIC21 to MIC27 of the microphone array MA20 are arranged in symmetrical positions with respect to the reference plane respectively. Concretely, for example, the microphone MIC11 and the microphone MIC21 are symmetrical to each other with respect to the reference plane, and also the microphone MIC17 and the microphone MIC27 are symmetrical to each other with respect to the reference plane.

Here, in the present embodiment, the number of speakers of the speaker array SPA10 is set to three, and the numbers of microphones of the microphone arrays MA10, MA20 are set to seven respectively. These numbers are not limited to above numerical values, and the number of speakers and the number of microphones may be set adequately according to the specification. Also, the speaker interval of the speaker array and the microphone interval of the microphone array may be set unevenly. For example, the microphones of the microphone array may be arranged in such a way that the distance between the microphones arranged in a center portion along the longer direction is set smaller than the distance between the microphones arranged in both end portions and the distance between the microphones is increased gradually toward both end portions.

In the voice emitting and collecting device of the present embodiment, the voices picked up by the microphones are delayed respectively and synthesized to shape a voice collecting directivity into a beam as the whole microphone array. The talker's voice emitted in a particular spot or area located in the course of this voice collecting beam can be picked up at a high gain, and also voices (noises) other than the talker's voice can be suppressed. Here, the voice collecting directivity shaped into the beam is called the voice collecting beam.

Figure 2A:
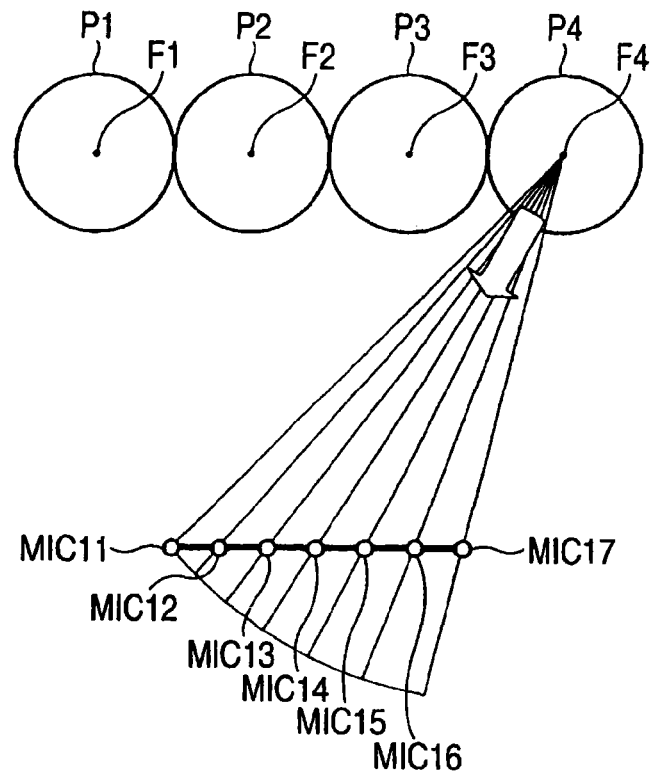
[FIG. 2] A view showing examples of a voice collecting mode set on the front side and the rear side of the voice emitting and collecting device respectively.
Figure 2B:
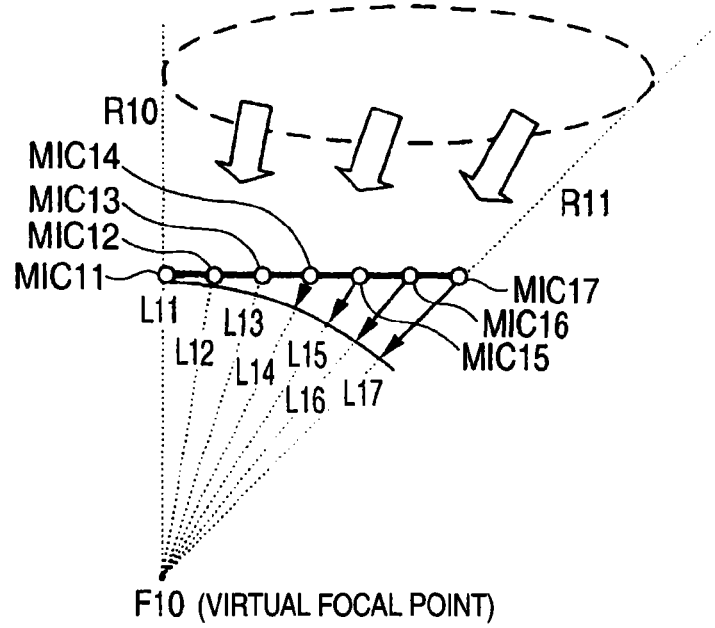

In the voice emitting and collecting device of the present embodiment, this beam shaping of the voice collecting directivity can be carried out in two modes. FIG. 2 is a view explaining two modes. FIG. 2A is a view explaining a spot voice collecting mode as the first mode. Also, FIG. 2B is a view explaining an area voice collecting mode as the second mode.

In FIG. 2A, the spot voice collecting mode is defined such that a voice collecting beam that places a focus on a spot at which the voice is picked up (voice collecting spot) is formed to pick up the voice from a narrow range at a high gain. Here, voice pick-up spots P1 to P4 are set to seating positions of the conferees, or the like, for example. Since the voice signals that the microphones MIC 11 to MIC17 (or the microphones MIC21 to MIC27) picked up are delayed as if the microphones are located at an equal distance from the focal point (in FIG. 2A, F4) respectively and then are synthesized, the voice generated around the focal point can be picked up at a high gain.

Here, the wording "at an equal distance from the focal point" denotes that a sum of the physical distance from the focal point to the microphone and the distance obtained by multiplying a delay time of the voice signal picked up by the microphone by the velocity of sound becomes equal with respect to respective microphones.

Figure 3A:
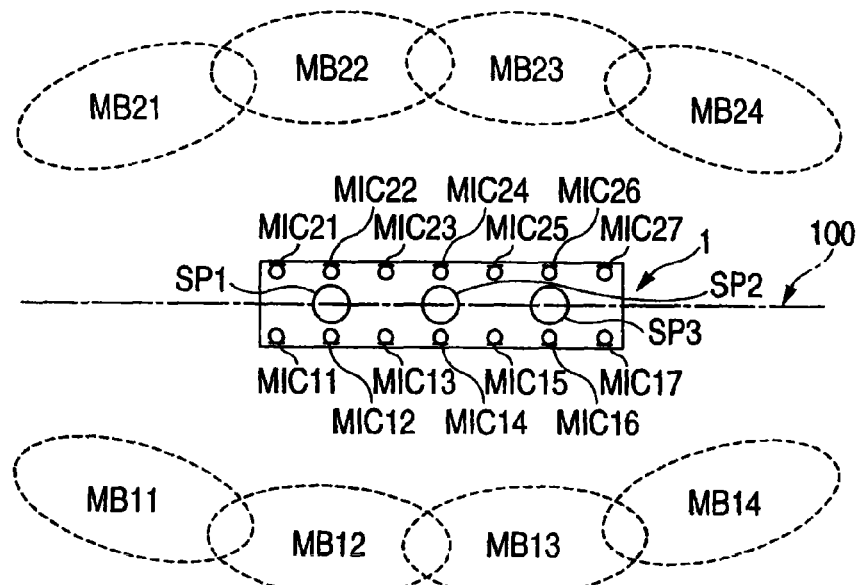
[FIG. 3] A view showing voice collecting beam areas formed by the voice emitting and collecting device.

In this case, in the spot voice collecting mode, a plurality of voice collecting spots are set to meet the seats of the conference room, or the like. For example, as shown in FIG. 3A, the microphone array MA10 forms voice collecting beams MB11 to MB14 directed to respective voice collecting spots, and the microphone array MA20 forms voice collecting beams MB21 to MB24 directed to respective voice collecting spots.

Next, FIG. 2B is a view explaining the area voice collecting mode. This area voice collecting mode is defined such that a virtual focal point F10 is set in the rear of the microphone array and the voice signals directed to this focal point F10 are picked up by the microphone array. In this mode, a range put between two half-lines R10, R11 that are extended from the virtual focal point F10 to pass through the microphones MIC11, MIC17 on both sides of the microphone array respectively corresponds to the voice collecting area. In this case, a position of the virtual focal point in the area voice collecting mode is not restricted to the position of F10, and may be set in response to the area from which the voice is to be picked up. In FIG. 2B, the microphone that is closest to the virtual focal point F10 is the microphone MIC11, and a distance between them is a distance L11. Respective distances L12 to L17 from other microphones MIC12 to MIC17 to the focal point F10 are longer than the distance L11. Therefore, delays that correspond to differences between the distances L12 to L17 and the distance L11 are given to the signals picked up by the microphones MIC12 to MIC17 respectively such that virtual distances from the microphones MIC12 to MIC17 to the focal point F10 become equal to the distance L11 between the microphone MIC11 and the focal point F10. As a result, the voices arriving from the voice collecting area are picked up by respective microphones, then their timings are adjusted by the above delays and the voices are synthesized at the substantially same timing to enhance a level.

Figure 3B:
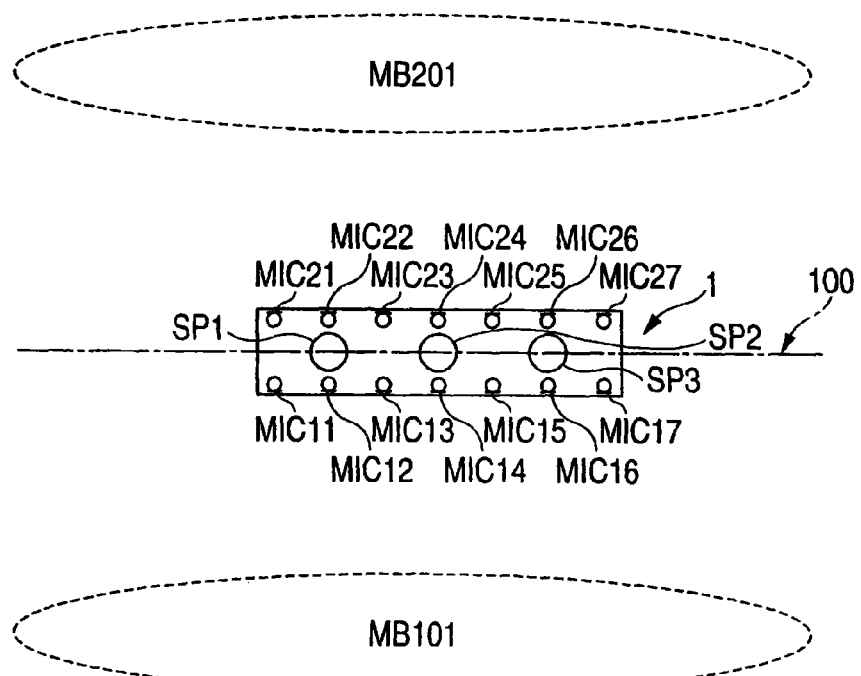

The area voice collecting mode does not have a high gain because its voice collecting range is wider than the above spot voice collecting mode, but this mode can collect the voice collectively from a wide area. When the talker moves, the talker's voice can be picked up exactly even though the microphone array is not moved to follow up such movement. In this area voice collecting mode, for example, as shown in FIG. 3B, the microphone array MA10 forms a voice collecting beam MB101 directed to the front voice collecting areas of the microphones MIC11 to MIC17, while the microphone array MA20 forms a voice collecting beam MB201 directed to the front voice collecting areas of the microphone MIC21 to MIC27.

Figure 4:
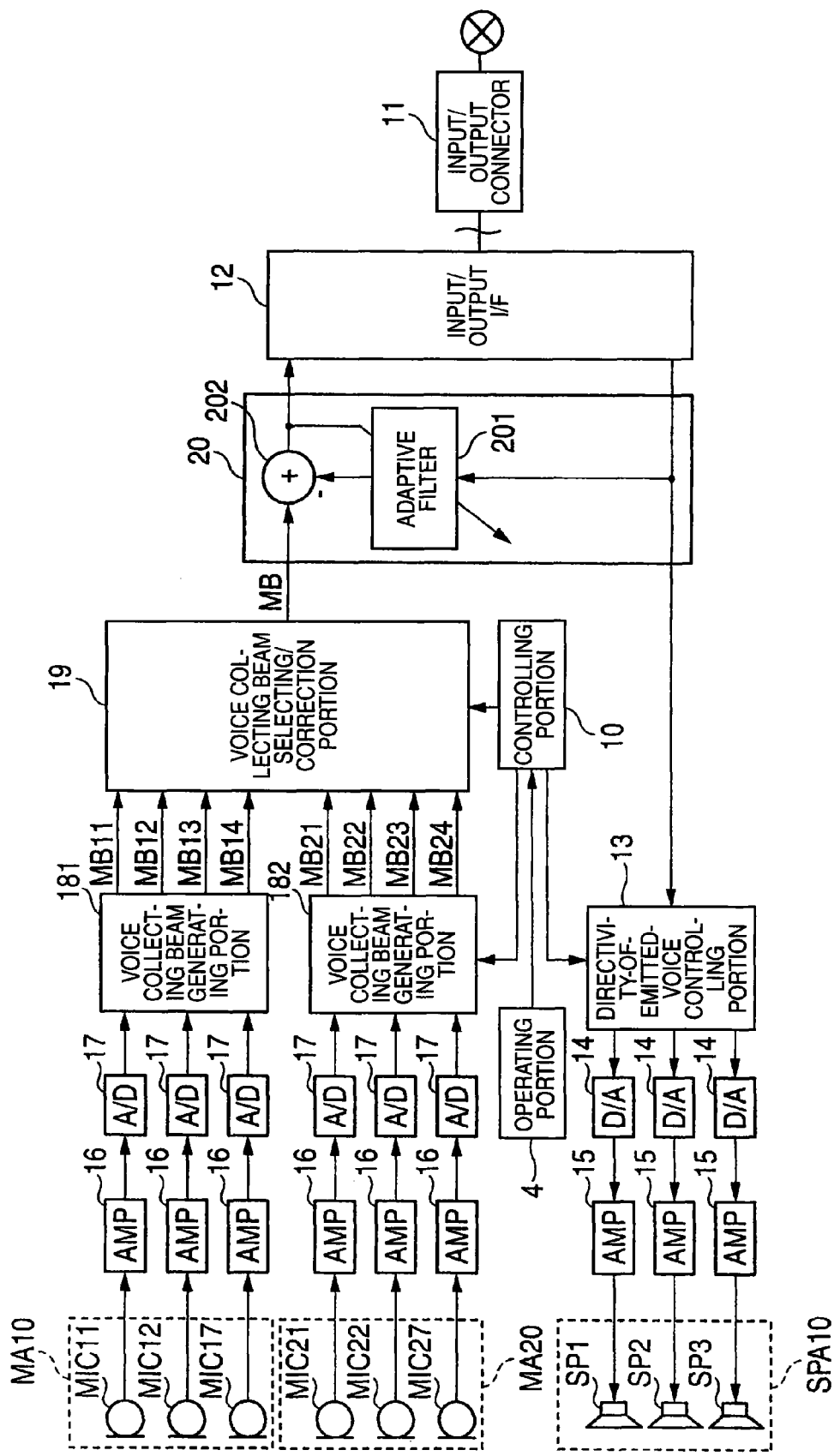
[FIG. 4] A block diagram showing a configuration of the voice emitting and collecting device.

Next, FIG. 4 is a block diagram showing a configuration of the voice emitting and collecting device 1. As shown in FIG. 4, the voice emitting and collecting device 1 of the present embodiment is equipped with an operating portion 4, a controlling portion 10, an input/output connector 11, an input/output I/F 12, a directivity-of-emitted-voice controlling portion 13, D/A converters 14, voice emitting amplifiers 15, the speaker array SPA10 (the speakers SP1 to SP3), the microphone arrays MA10, MA20 (the microphones MIC11 to MIC17, MIC21 to MIC27), voice collecting amplifiers 16, A/D converters 17, voice collecting beam generating portions 181, 182, a voice collecting beam selecting/correcting portion 19, and an echo canceling portion 20.

The controlling portion 10 controls generally the voice emitting and collecting device 1, and instructs the voice collecting beam generating portions 181, 182 and the voice collecting beam selecting/correcting portion 19 to switch two voice collecting modes. The operating portion 4 accepts the operation input from the user, and outputs it to the controlling portion 10. The user can instruct the operating portion 4 to issue the switching command between two voice collecting modes.

The input/output I/F 12 transforms the input voice signal being input from other voice emitting and collecting device via the input/output connector 11 from a data format (protocol) corresponding to the network, and gives a transformed voice signal to the directivity-of-emitted-voice controlling portion 13 via the echo canceling portion 20. Also, the input/output I/F 12 transforms the output voice signal being generated by the echo canceling portion 20 into a data format (protocol) corresponding to the network, and sends out a transformed voice signal to the network via the input/output connector 11.

When the directivity of the emitted voice is not set, the directivity-of-emitted-voice controlling portion 13 gives simultaneously the voice emitting signal based upon the input voice signal to respective speakers SP1 to SP3 of the speaker array SPA 10. Also, when the directivity of the emitted voice is pointed by setting the virtual point sound source, and the like, the directivity-of-emitted-voice controlling portion 13 generates individual voice emitting signals by applying a delay process, an amplitude process, etc. peculiar to the speakers SP1 to SP3 of the speaker array SPA10 respectively based on the pointed directivity of the emitted voice. The directivity-of-emitted-voice controlling portion 13 outputs these individual voice emitting signals to the D/A converters 14 provided to the speakers SP1 to SP3 respectively. The D/A converters 14 transform individual voice emitting signals into an analog format respectively, and output the transformed signals to the voice emitting amplifiers 15 respectively. The voice emitting amplifiers 15 amplify individual voice emitting signals respectively, and give the amplified signals to the speakers SP1 to SP3 respectively.

The speakers SP1 to SP3 emit the voices based on the given individual voice emitting signals to the outside. Since the speakers SP1 to SP3 are installed in the lower surface of the case 101, the emitted voices are reflected by an installing surface of the desk on which the voice emitting and collecting device 1 is installed, and then are propagated through the unit to go obliquely upward to the conferees. Also, a part of the emitted voices goes around from the bottom surface of the voice emitting and collecting device 1 to the side surfaces in which the microphone arrays MA10, MA20 are installed.

As the microphones MIC11 to MIC17, MIC21 to MIC27 of the microphone arrays MA10, MA20, either the omnidirectional microphone or the directional microphone may be employed. But it is desirable that the directional microphone should be employed. The microphones MIC11 to MIC17, MIC21 to MIC27 pick up the voices coming from the outside of the voice emitting and collecting device 1, and output the collected voice signals to the voice collecting amplifiers 16.

At this time, with such configuration of the speaker array SPA 10 and such configurations of the microphone arrays MA10, MA20, the diffracting voices from the discrete speakers SP1 to SP3 of the speaker array SPA10 are picked up equally by the microphone MIC1n (n=1 to 7) of the microphone array MA10 and the microphone MIC2n (n=1 to 7) of the microphone array MA20 that are located in symmetrical positions with respect to the reference plane.

The voice collecting amplifier 16 amplifies the sound collecting signal and gives the amplified signal to the A/D converter 17 respectively. The A/D converter 17 converts the sound collecting signal into a digital signal and outputs the digital signal selectively to the voice collecting beam generating portions 181, 182 respectively. The sound collecting signals fed from the microphones MIC11 to MIC17 of the microphone array MA10 installed in one long surface are input into the voice collecting beam generating portion 181. The sound collecting signals fed from the microphones MIC21 to MIC27 of the microphone array MA20 installed in the other long surface are input into the voice collecting beam generating portion 182.

The voice collecting beam generating portion 181 and the voice collecting beam generating portion 182 apply the delay process to the voice signals picked up by respective microphones based on the voice collecting mode pointed by the operating portion 10, to form either the spot-type voice collecting beam or the area-type voice collecting beam shown in FIG. 2A, FIG. 2B and FIG. 3A, FIG. 3B.

The voice collecting beam generating portion 181 applies a predetermined delay process, and the like to the voice collecting signal picked up by the microphones MIC11 to MIC17. At a time of the spot voice collecting mode, as described above, the voice collecting beam generating portion 181 produces the voice collecting beam signals MB11 to MB14 as the signal in which the voice coming from a particular spot is emphasized. Also, at a time of the area voice collecting mode, the voice collecting beam generating portion 181 produces the voice collecting beam signal MB101 as the signal in which the voice coming from a particular area is emphasized. As shown in FIG. 3A, with regard to the voice collecting beams MB11 to MB14, areas having a predetermined different width respectively along the long surface on the long surface side in which the microphones MIC11 to MIC17 are installed are set as the voice collecting beam areas (particular space and directions emphasized by the voice collecting beam signal). Also, as shown in FIG. 3B, with regard to the voice collecting beam MB101, the area having a predetermined width (wide area) along the long surface on the long surface side in which the microphones MIC11 to MIC17 are installed is set as the voice collecting beam area.

The voice collecting beam generating portion 182 applies a predetermined delay process, and the like to the voice collecting signal picked up by the microphones MIC21 to MIC27. At a time of the spot voice collecting mode, the voice collecting beam signals MB21 to MB24 are produced. Also, at a time of the area voice collecting mode, the voice collecting beam generating portion 182 produces the voice collecting beam signal MB201. As shown in FIG. 3A, with regard to the voice collecting beams MB21 to MB24, areas having a predetermined different width respectively along the long surface on the long surface side in which the microphones MIC21 to MIC27 are installed are set as the voice collecting beam areas. Also, as shown in FIG. 3B, with regard to the voice collecting beam MB201, the area having a predetermined width (wide area) along the long surface on the long surface side in which the microphones MIC21 to MIC27 are installed is set as the voice collecting beam area.

At this time, the voice collecting beam MB11 and the voice collecting beam MB21 are formed as symmetrical beams with respect to the vertical plane (reference plane) having the center axis 100. Similarly, the voice collecting beam MB12 and the voice collecting beam MB22, the voice collecting beam MB13 and the voice collecting beam MB23, and the voice collecting beam MB14 and the voice collecting beam MB24 are formed as the symmetrical beams with respect to the reference plane. Also, the voice collecting beam MB101 and the voice collecting beam MB201 are formed as the symmetrical beams with respect to the reference plane.

The voice collecting beam selecting/correcting portion 19 calculates difference signals between the voice collecting beam signals MB11 to MB14 and the voice collecting beam signals MB21 to MB24 being input at a time of the spot voice collecting mode respectively. Then, the voice collecting beam selecting/correcting portion 19 selects the difference signal having a highest level out of these difference signals, and outputs this difference signal to the echo canceling portion 20 as a corrected voice collecting beam signal MB. Also, the voice collecting beam selecting/correcting portion 19 calculates a difference signal between the voice collecting beam signal MB101 and the voice collecting beam signal MB201 being input at a time of the area voice collecting mode. Then, the voice collecting beam selecting/correcting portion 19 outputs this difference signal to the echo canceling portion 20 as the corrected voice collecting beam signal MB.

Figure 5:
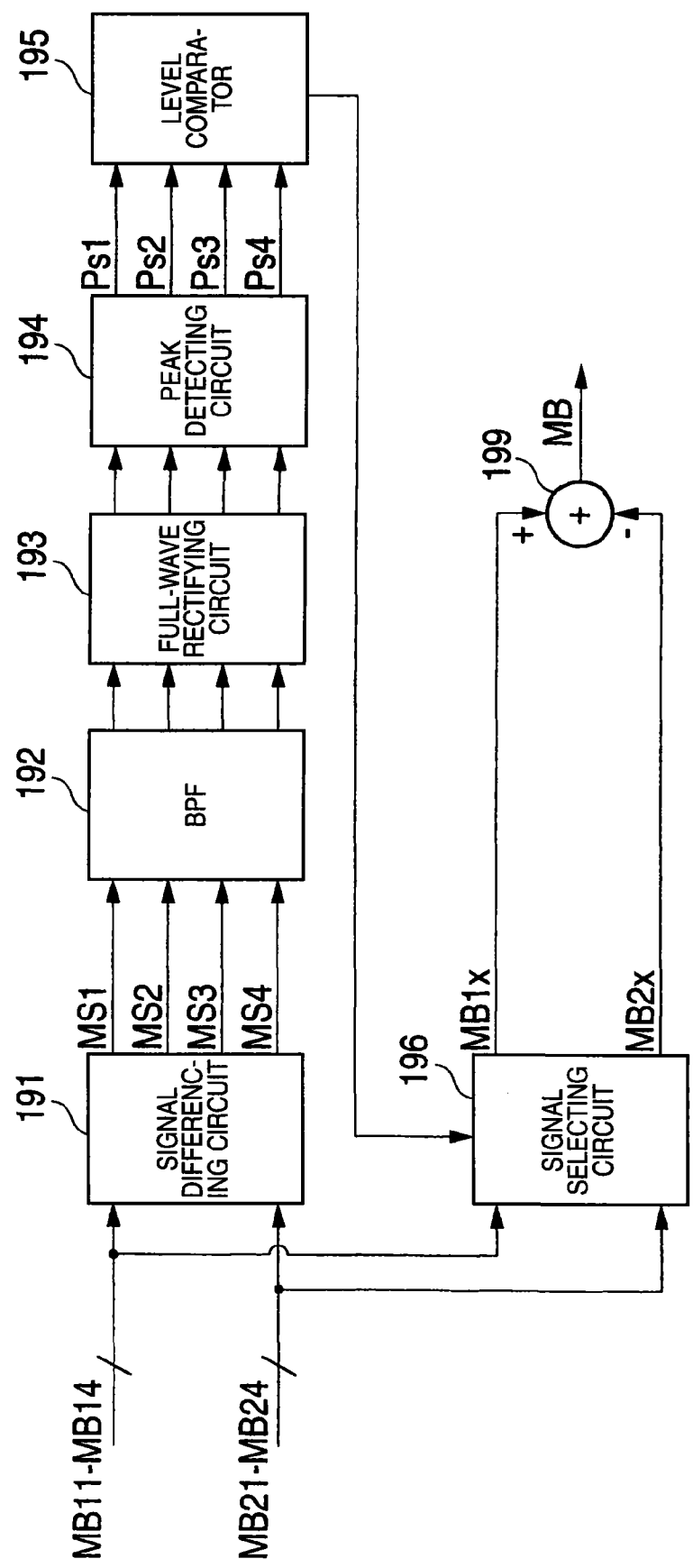
[FIG. 5] A block diagram showing a configuration of a voice collecting beam selecting/correction portion 19 shown in FIG. 4.

FIG. 5 is a block diagram showing a major configuration of the voice collecting beam selecting/correction portion 19.

The voice collecting beam selecting/correction portion 19 includes a signal differencing circuit 191, a BPF (band-pass filter) 192, a full-wave rectifying circuit 193, a peak detecting circuit 194, a level comparator 195, a signal selecting circuit 196, and a subtracter 199.

The signal differencing circuit 191 calculates differences between the voice collecting beam signals that are symmetrical with respect to the reference plane respectively from the voice collecting beam signals MB11 to MB14 and the voice collecting beam signals MB21 to MB24. Concretely, the signal differencing circuit 191 calculates a difference between the voice collecting beam signals MB11 and MB21 to produce a difference signal MS1, and also calculates a difference between the voice collecting beam signals MB12 and MB22 to produce a difference signal MS2. Also, the signal differencing circuit 191 calculates a difference between the voice collecting beam signals MB13 and MB23 to produce a difference signal MS3, and also calculates a difference between the voice collecting beam signals MB14 and MB24 to produce a difference signal MS4. In the difference signals MS1 to MS4 produced in this manner, the original voice collecting beams are aligned symmetrically with respect to an axis of the speaker array on the reference plane.

The BPF 192 is a band-pass filter that has a band to which the beam characteristic mainly belongs and a band to which main components of the human voice belong as its pass band. This BPF 192 applies a band-pass filtering process to the difference signals MS1 to MS4, and outputs resultant signals to the full-wave rectifying circuit 193. The full-wave rectifying circuit 193 full-wave rectifies the difference signals MS1 to MS4 (calculates their absolute values). The peak detecting circuit 194 detects respective peaks of the difference signals MS1 to MS4 that are full-wave rectified, and outputs peak value data Ps1 to Ps4. The level comparator 195 compares the peak value data Ps1 to Ps4 mutually, and gives selection instructing data used to select the difference signal MS, which corresponds to peak value data Ps having the highest level, to the signal selecting circuit 196.

This operation is made by utilizing the fact that a signal level of the voice collecting beam signal corresponding to the voice collecting area in which the talker exists is higher than signal levels of the voice collecting beam signals corresponding to other areas. That is, when one of the voice collecting beam signals that are symmetrical with respect to the reference plane respectively is the voice collecting beam signal corresponding to the voice collecting area where the talker exists, a signal level of the difference signal exists at some height level because of the presence of the voice emitted from the talker. In contrast, when both voice collecting beam signals correspond to the voice collecting area where the talker does not exist, mutual diffracting voice components are canceled respectively, and thus a signal level of the difference signal becomes extremely low. Therefore, a signal level of the difference signal containing the voice collecting beam signal corresponding to the voice collecting area where the talker exists is increased higher than other difference signals. As a result, the taker's direction can be detected by selecting the difference signal whose signal level is highest.

Figure 6A:
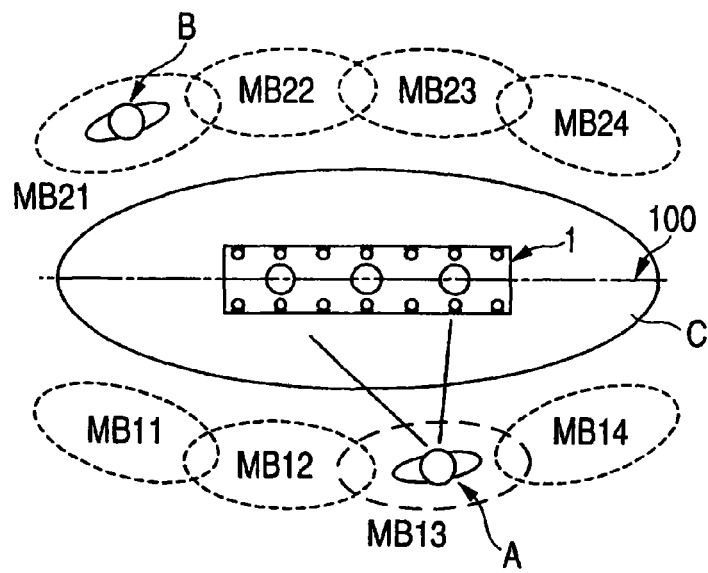
[FIG. 6] A view showing a situation that the voice emitting and collecting device 1 of the present embodiment is put on a desk C and two conferees A, B are having a session.
Figure 6B:
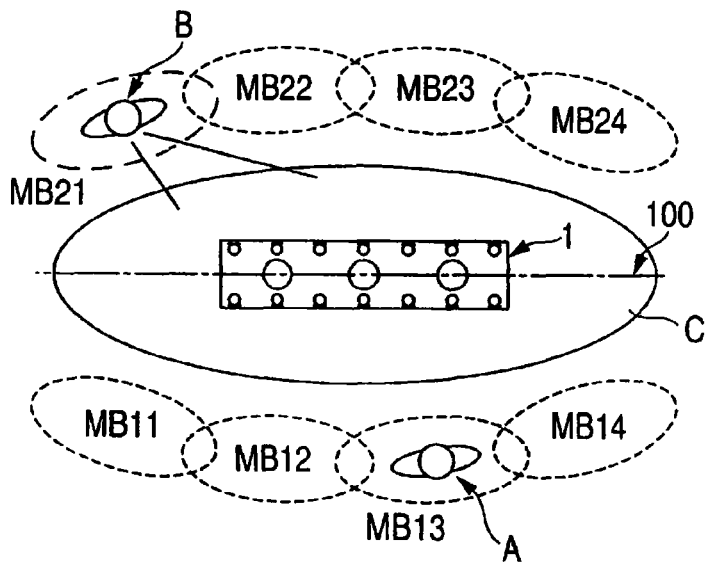
Figure 6C:
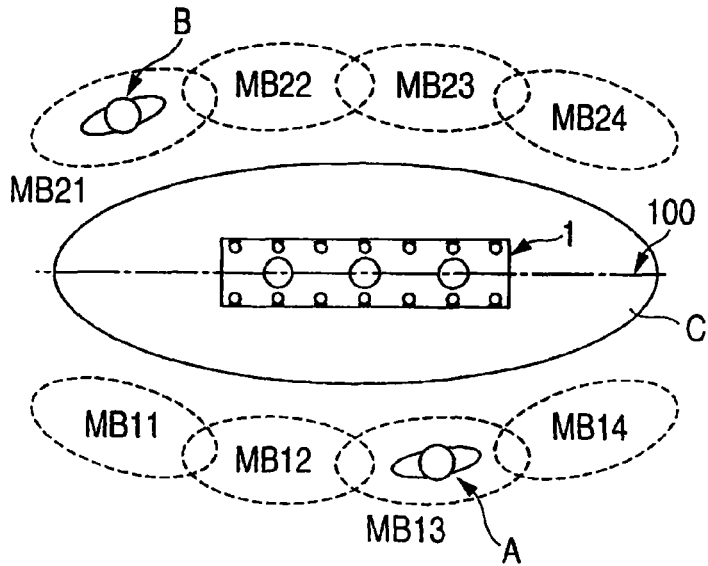

FIG. 6A, FIG. 6B and FIG. 6C is a view showing a situation that the voice emitting and collecting device 1 of the present embodiment is put on a desk C and two conferees A, B are having a session. FIG. 6A shows a situation that the conferee A is talking, FIG. 6B shows a situation that the conferee B is talking, and FIG. 6C shows a situation that both the conferees A, B are not talking.

For example, as shown in FIG. 6A, when the conferee A who is present in the area corresponding to the voice collecting beam MB13 starts to talk, a signal level of the voice collecting beam MB13 becomes higher than the signal levels of other voice collecting beams MB11, MB12, MB14, MB21 to MB24. Therefore, a signal level of the difference signal MS3 obtained by subtracting the voice collecting beam MB23 from the voice collecting beam MB13 becomes higher than the signal levels of the difference signals MS1, MS2, MS4. As a result, the peak value data Ps3 of the difference signal MS3 becomes higher than other peak value data Ps1, Ps2, Ps4, and the level comparator 195 detects the peak value data Ps3 and gives the selection instructing data to the signal selecting circuit 196 to select the difference signal MS3. In contrast, as shown in FIG. 6B, when the conferee B who is present in the area corresponding to the voice collecting beam MB21 starts to talk, a level comparator 195 detects the peak value data Ps1 and gives the selection instructing data to the signal selecting circuit 196 to select the difference signal MS1.

Here, as shown in FIG. 6C, in a situation that both the conferees A, B are not talking, when the level comparator 195 detects that all peak value data Ps1 to Ps4 do not reach a predetermined threshold value, and the level comparator 195 gives the preceding selection instructing data to the signal selecting circuit 196.

The signal selecting circuit 196 selects two voice collecting beam signals MB1x, MB2x (x=1 to 4) constituting the difference signal MS that is pointed by the given selection instructing data. For example, the signal selecting circuit 196 selects the voice collecting beams MB13, MB23 constituting the difference signal MS3 in a situation in FIG. 6A, and the signal selecting circuit 196 selects the voice collecting beams MB11, MB21 constituting the difference signal MS1 in a situation in FIG. 6B.

The subtracter 199 subtracts the voice collecting beam signal MB2x from the voice collecting beam signal MB1x input from the signal selecting circuit 196 to correct, and gives the corrected voice collecting beam signal MB to the echo canceling portion 20.

For example, in a situation in FIG. 6A, the subtracter 199 subtracts the voice collecting beam signal MB23 from the voice collecting beam signal MB13, and gives a resultant signal to the echo canceling portion 20 as the corrected voice collecting beam signal MB. In a situation in FIG. 6B, the subtracter 199 subtracts the voice collecting beam signal MB21 from the voice collecting beam signal MB11, and gives a resultant signal to the echo canceling portion 20 as the corrected voice collecting beam signal MB.

In the above explanation, an example in which the voice collecting beam signal MB2x is subtracted from the voice collecting beam signal MB1x to made a correction. Conversely, the voice collecting beam signal MB1x may be subtracted from the voice collecting beam signal MB2x to made a correction. In either case, the difference signal indicating the maximum level is output (but a signal level is inverted). Therefore, the voice of the talker (the voice based on the corrected voice collecting beam signal MB) is emitted on the voice emitting side that receives this signal.

The above explanation shows an operation taken when the voice collecting beam selecting/correcting portion 19 is pointed by the controlling portion 10 to do the spot voice collecting mode. But the voice collecting beam selecting/correcting portion 19 executes the similar operation at a time of the area voice collecting mode. At a time of the area voice collecting mode, it is possible to form the voice collecting beam in a plurality of different areas in parallel. Also, the corrected voice collecting beam signal MB is output when the voice collecting beam selecting/correcting portion 19 executes the similar operation.

In this event, following operations may be executed at a time of the area voice collecting mode. That is, the signal differencing circuit 191 does not output the input voice collecting beam signals MB101, MB201 to the later stage (the BPF 192 to the level comparator 195) and abandons them, and the signal selecting circuit 196 gives the input voice collecting beam signals MB101, MB201 to the subtracter 199 as they are. The subtracter 199 subtracts the voice collecting beam signal MB201 from the voice collecting beam signal MB101 being input from the signal selecting circuit 196 to make a correction, and gives the corrected voice collecting beam signal MB to the echo canceling portion 20. In this manner, at a time of the area voice collecting mode, the voice collecting beam signals MB101, MB201 that are symmetrical with respect to the reference plane are always input, and therefore the difference signal indicating the maximum level is output not to execute the level comparison of respective voice collecting beam signals. As a result, mutual diffracting voice components contained in the voice collecting beam signals MB101, MB201 are cancelled mutually, and other voice (the talker's voice) is output in an emphasized fashion. In this case, the signal differencing circuit 191 may output the input voice collecting beam signals MB101, MB201 to the later stage. Because there is no voice collecting beam signal as the compared object, and consequently the level comparator 195 must made the instruction to select the voice collecting beam signals MB101, MB201. Also, when the voice emitting and collecting device executes the area voice collecting mode only, the signal differencing circuit 191, the BPF 192, the full-wave rectifying circuit 193, the peak detecting circuit 194, and the level comparator 195 are not essential constituent elements.

The echo canceling portion 20 has an adaptive filter 201 and a post processor 202. The adaptive filter 201 produces a pseudo regression voice signal based on the voice collecting directivity of the corrected voice collecting beam signal MB that is selected, in response to the input voice signal. The post processor 202 subtracts the pseudo regression voice signal from the corrected voice collecting beam signal MB being output from the voice collecting beam selecting/correcting portion 19, and outputs a resultant signal to the input/output I/F 12 as the output voice signal. Because such echo canceling process is executed, the diffracting voice that cannot be satisfactorily suppressed by the voice collecting beam selecting/correcting portion 19 can be suppressed, so that the emitted voice can be picked up and output at a higher S/N ratio.

As described above, in spite of such a simple configuration that the difference signal between the diffracting voice picked up by the microphone array whose voice collecting direction is the direction toward the talker and the diffracting voice picked up by the microphone array whose voice collecting direction is the opposite side to the direction toward the talker should be output, the voice that goes around from the speaker to the microphone can be suppressed.

Here, when the voice emitting and collecting device of the present embodiment executes the area sound collecting mode only, two unidirectional microphones whose directional axes are directed symmetrically with respect to the reference plane mutually may be employed instead of the microphone arrays MA10 and MA20. In this case, the voice collecting beam generating portion 181 and the voice collecting beam generating portion 182 may output the voice signals that the unidirectional microphones pick up respectively not to apply the delay control.

In this event, the voice collecting beam selecting/correction portion 19 may be constructed as follows.

Figure 7:
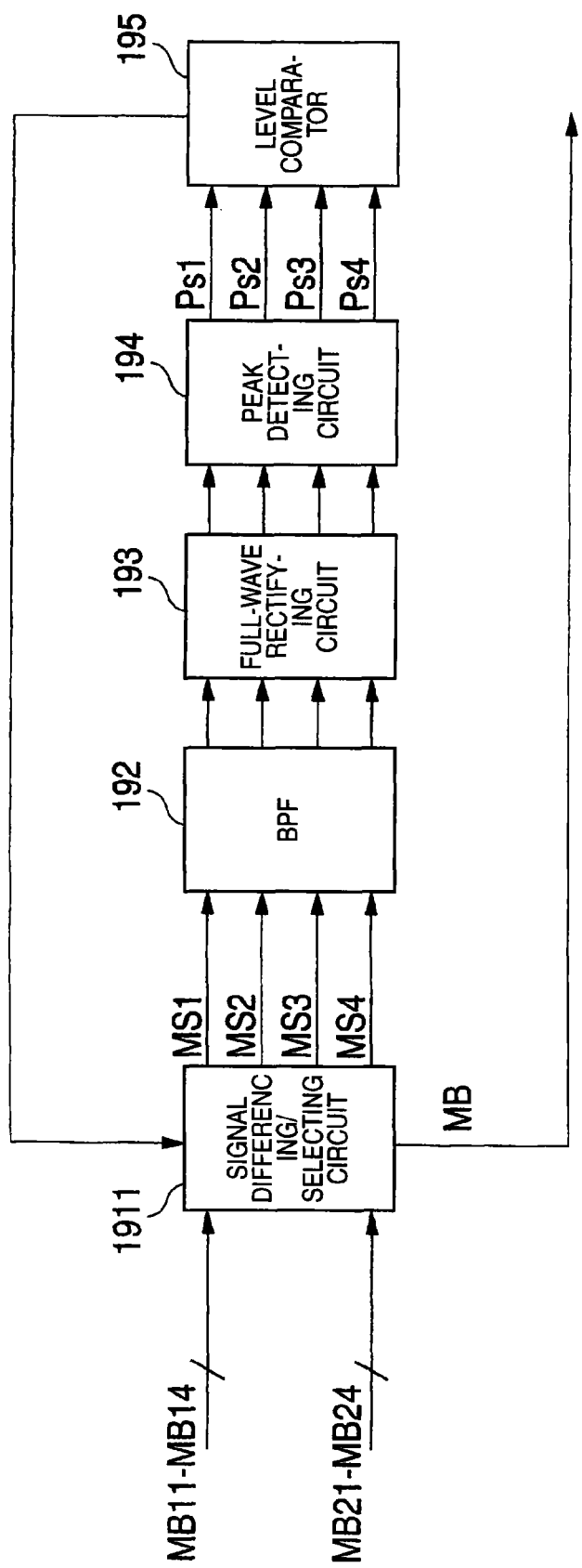
[FIG. 7] A block diagram showing a configuration of a voice collecting beam selecting/correction portion 19 in a second embodiment of the present invention.

FIG. 7 is a block diagram showing a configuration of major portions of the voice collecting beam selecting/correction portion 19 in a second embodiment of the present invention. In the voice emitting and collecting device of the second embodiment, the configuration of the voice collecting beam selecting/correction portion 19 is different from the voice emitting and collecting device of the first embodiment shown in FIG. 4 and FIG. 5, but other configurations are similar. Therefore, in the second embodiment, only different portions of the voice collecting beam selecting/correction portion 19 will be explained hereunder, and explanation of remaining portions will be omitted herein.

In the voice collecting beam selecting/correction portion 19 of the second embodiment, the voice collecting beams MB11 to MB14, MB21 to MB24 being output from the voice collecting beam generating portions 181, 182 are input into a signal differencing/selecting circuit 1911.

Like the signal differencing circuit 191, the signal differencing/selecting circuit 1911 calculates difference signals between the voice collecting beams MB11 to MB14 and the voice collecting beams MB21 to MB24 respectively.

The functions of the BPF 192, the full-wave rectifying circuit 193, the peak detecting circuit 194, and the level comparator 195 are similar to those in the first embodiment, and therefore their explanation will be omitted herein. Then, the selection instructing data being output from the level comparator 195 is input into the signal differencing/selecting circuit 1911.

The signal differencing/selecting circuit 1911 selects the difference signal MS based on the selection instructing data of the level comparator 195, and gives this difference signal MS to the echo canceling portion 20 as the corrected voice collecting beam signal MB. For example, since the difference signal MS3 has the highest level in a situation shown in FIG. 6A, the signal differencing/selecting circuit 1911 gives the difference signal MS3 to the echo canceling portion 20 as the corrected voice collecting beam signal MB. In contrast, since the difference signal MS1 has the highest level in a situation shown in FIG. 6B, the signal differencing/selecting circuit 1911 gives the difference signal MS1 to the echo canceling portion 20 as the corrected voice collecting beam signal MB. In this case, at a time of the area voice collecting mode, the signal differencing/selecting circuit 1911 gives the difference signal between the input voice collecting beams MB101 and MB201 to the echo canceling portion 20 as the corrected voice collecting beam signal MB, and does not output the difference signal to the BPF 192.

Like the first embodiment, the echo canceling portion 20 applies an echo canceling process to the corrected voice collecting beam signal MB, and then outputs a resultant signal to the input/output I/F 12.

In this manner, even with such a simpler configuration that the selection instructing data of the level comparator 195 is fed back to the signal differencing/selecting circuit 1911, the emitted voice can be picked up and output at a high S/N ratio.

The present invention is explained in detail with reference to the particular embodiments as above. But it is apparent for those skilled in the art that various variations and modifications can be applied without departing from claims and a scope or an intended range of the present invention.

The present invention is based upon Japanese Patent Application (Patent Application No. 2006-179792) filed on Jun. 29, 2006; the contents of which are incorporated herein by reference.

The invention claimed is:

1. A voice emitting/collecting device, comprising:
a speaker which emits a voice at a sound pressure that is symmetrical with respect to a predetermined reference plane;
a first microphone group which collects a voice on one side of the predetermined reference plane, and a second microphone group which collects a voice on other side of the predetermined reference plane;
a voice collecting beam generating portion which generates respective voice collecting beam signals of a first voice collecting beam signal group based on voice collecting signals of the first microphone group, and which generates respective voice collecting beam signals of a second voice collecting beam signal group based on voice collecting signals of the second microphone group symmetrically with respect to the predetermined reference plane;
a difference signal generating portion which generates difference signals between the voice collecting beam signals of the first voice collecting beam signal group and the voice collecting beam signals of the second voice collecting beam signal group respectively;
a signal comparing portion which compares absolute levels of respective difference signals to select a difference signal having a maximum level; and
a voice collecting beam signal outputting portion which outputs the difference signal having the maximum level, which is selected by the signal comparing portion.

2. The voice emitting and collecting device according to claim 1, wherein the first microphone group includes a plurality of microphones that are aligned linearly along the predetermined reference plane; and
wherein the second microphone group includes a plurality of microphones that are aligned linearly along the predetermined reference plane.

3. The voice emitting and collecting device according to claim 1, further comprising:
a regression voice removing portion which subtracts a pseudo signal, which is derived by processing an input voice signal by means of an adaptive filter, from the voice collecting beam signal output from the voice collecting beam signal outputting portion, to apply control so that the voice emitted from the speaker is not contained in an output voice signal.

4. A voice emitting and collecting device, comprising:
a speaker which emits a voice at a sound pressure that is symmetrical with respect to a predetermined reference plane;
a first voice collecting portion which collects a voice in a first area on one side of the predetermined reference plane as a first voice collecting signal;
a second voice collecting portion which collects a voice in a second area on other side, which is symmetrical to the first area with respect to the predetermined reference plane, as a second voice collecting signal;
a difference signal generating portion which generates a difference signal between the first voice collecting signal and the second voice collecting signal;
a voice collecting signal outputting portion which outputs the difference signal; and
a subtracting portion which performs subtraction between one of the respective voice collecting beam signals of the first voice collecting beam signal group and one of the respective voice collecting beam signals of the second voice collecting beam signal group, the subtracted voice collecting beam signals corresponding to the voice collecting beam signals used to form the output difference signal output by the voice collecting beam signal outputting portion, and the subtracted voice collecting beam signals corresponding to voice collecting spots located across from each other with respect to the reference plane.

5. The voice emitting and collecting device according to claim 4, wherein the first voice collecting portion includes a first microphone array having a plurality of microphones that are aligned linearly along the predetermined reference plane; and wherein the second voice collecting portion includes a second microphone array having a plurality of microphones that are aligned linearly along the predetermined reference plane, the voice emitting and collecting device further comprising:

a first voice collecting beam signal generating portion which generates a first voice collecting beam signal from the first voice collecting signal, by setting a first virtual focal point in an opposite direction to the first area, from which the first microphone array picks up the voice, with respect to the predetermined reference plane and then delaying and synthesizing voice signals picked up by a plurality of microphones of the first microphone array respectively so that distances between the plurality of microphones of the first microphone array and the first virtual focal point become equal respectively; and a second voice collecting beam signal generating portion which generates a second voice collecting beam signal from the second voice collecting signal, by setting a second virtual focal point in an opposite direction to the second area, from which the second microphone array picks up the voice, with respect to the predetermined reference plane and then delaying and synthesizing voice signals picked up by a plurality of microphones of the second microphone array respectively so that distances between the plurality of microphones of the second microphone array and the second virtual focal point become equal respectively.

* * * * *